No. 627,686. J. L. CREVELING. Patented June 27, 1899.
AUTOMATIC ELECTRIC SWITCH.
(Application filed Jan. 18, 1899.)
(No Model.)
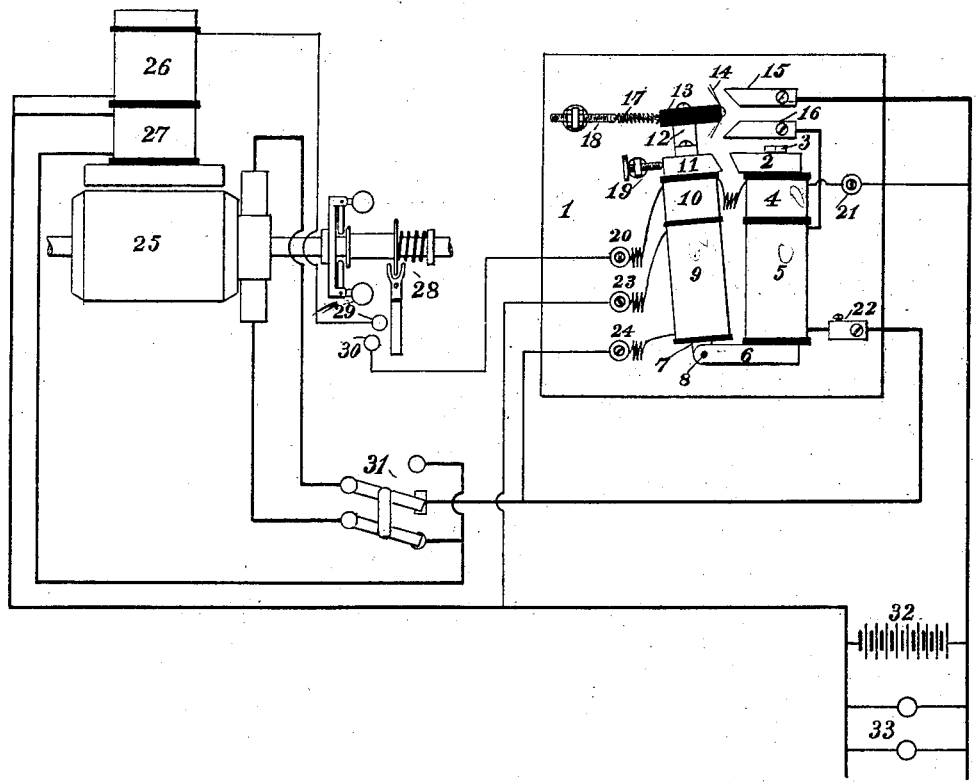
Witnesses:
Elmer E Albee
H. G. Darwin
Inventor:
John L. Creveling

UNITED STATES PATENT OFFICE.

JOHN L. CREVELING, OF NEW YORK, N. Y.

AUTOMATIC ELECTRIC SWITCH.

SPECIFICATION forming part of Letters Patent No. 627,686, dated June 27, 1899.

Application filed January 18, 1899. Serial No. 702,504. (No model.)

*To all whom it may concern:*

Be it known that I, JOHN L. CREVELING, a citizen of the United States, residing in New York, county of New York, State of New York, have invented a new and useful Improvement in Automatic Electric Switches, of which the following is a specification, reference being had to the accompanying drawing.

In charging storage batteries by a dynamo or generator driven from the variable or intermittent source of motion it becomes necessary to have some means of breaking the circuit between the armature and the storage battery when the speed of the armature shall fall, so as to cause the electromotive force of the generator to be less than that of the battery, lest the battery shall discharge through the dynamo, tending to drive the same as a motor. Of course in a plant under the care of an attendant this circuit could be broken by means of any of the well-known hand-switches; but where no attendant is at hand it requires an automatic switch which shall properly respond to the rise and fall of the voltage. Many kinds of switches may be made to close this circuit at a predetermined voltage and to open the same when the voltage of the generator shall fall to a certain degree; but in my present invention I have caused this automatic circuit-closing switch to perform an additional function in that it will not close the circuit unless the current supplied to the mains be in proper direction and a proper voltage to charge the battery. This feature is particularly valuable where the generator is driven by a reversible source of motion, as a generator deriving its power from the axle of the car. Of course under such circumstances it becomes necessary to so connect the armature-shaft to the axle that it shall run in one direction regardless of the direction of revolution of the car-axle, or, more commonly, to place an automatic pole-changing switch in the armature-circuit, which is intended to rectify the current for the reversal of rotation of the armature. Now if through any injury or fault the device for so rectifying the current should fail to perform its office it is possible that a current of the wrong polarity might be supplied to the mains, which in the usual type of automatic switch would cause the battery to be connected with the mains when the voltage of the dynamo reached the predetermined amount. As this result would be very undesirable in a system of this kind, I have employed a switch which I have found to overcome this difficulty and which is fully described in the following specification and drawing, forming a part thereof.

The drawing shows in elevation a form of this switch as employed by me at present, and the said drawing, together with the specification, will suffice to enable one skilled in the art to make and use my invention.

In the drawing, 1 represents the base or back board, on which the various parts of the switch are mounted. It may be of any desired material, in this instance being taken as an insulating substance, as soapstone or fiber board.

2 designates the pole-piece of an electromagnet screwed to the core of the same, as by the screw 3. Around this core are wound the two bobbins 4 and 5 in such manner as will hereinafter be explained.

6 represents a yoke attached to the above-mentioned magnet-core and supporting the movable magnet-core 7, as by the pivot 8. Upon this magnet-core 7 are wound the two bobbins 9 and 10 in such manner as to be described. The core 7 terminates in the pole-piece 11, upon which is mounted the support 12, preferably of a non-magnetic metal, to which is attached the insulating member 13, carrying the contact-strips 14.

15 and 16 are contact-bars so located as to have no electrical connection with each other when the switch is open or in the position shown in the drawing, but to be electrically connected with each other by the contact-strips 14 when the pole-piece 11 is drawn toward the pole-piece 2.

The tension-spring 17, adjustable as by the screw 18, tends to draw the pole-piece 11 away from the pole-piece 2, while the distance it may be drawn away is adjustable as by means of the screw 19.

20, 21, 22, 23, and 24 represent binding-posts for connecting the various wires with the windings of the coils or bobbins.

25 represents the armature, 26 the field-energizing or shunt coil, and 27 the series or regulating coils of the dynamo or generator, which may be of any suitable tpye.

28 represents a centrifugal governor of any suitable construction adapted to cause electrical connection between the contacts 29 and 30 when the rotation of the armature reaches a certain speed and to break said connection when the speed falls below this point.

31 represents a pole-changer, which may be of any desired type adapted to reverse the dynamo-terminals upon reversal of direction of the rotation of the armature.

32 represents the storage battery or accumulator, and 33 indicates lamps or other translating devices.

The current which flows through the coils 4 and 10 is taken from the storage-battery main by the derived circuit, and thus is always in one direction. These coils, which may be either in series or multiple with each other, are so wound that when the current is caused to flow through them they tend to make the pole-pieces 2 and 11 either both north-seeking or both south-seeking poles. Thus each will repel the other. Of course the terminals 20 and 21 might be connected across the battery-mains, and thus accomplish the above result, the coils in this case being wound with comparatively small wire. However, as I have used this switch mostly in connection with a generator having a switch operated by centrifugal force, which connects the shunt-coils of the generator across the battery-mains at a predetermined speed, so as to cause the dynamo to generate immediately after attaining this speed, I prefer to wind the coils 4 and 10 with a comparatively coarse wire and place them in series with the shunt-coils 26. Thus when the dynamo-armature is running very slowly or at rest and the centrifugal switch having broken the shunt-circuit no current is wasted by flowing through the coils 4 and 10, in which it is not needed until the dynamo begins to generate.

One of the dynamo-mains is connected directly to the battery and the other is brought into the binding-post 22, and the wire is carried from 15 to the other terminal of the battery. Thus it is obvious that when the switch is in the position shown in the drawing the charging-circuit is open and that when the pole-piece 11 is moved over toward the pole-piece 2, so as to cause 14 to establish connection between 15 and 16, the charging-circuit is closed, and the charging-current will flow through the windings of the coil 5, which is wound with a coarse wire and in such manner that when the batteries are charging the current flowing through the coil 5 causes the lines of force generated to be in the same direction as those produced by the bobbin 4.

The bobbin 9 is wound with fine wire and is placed in shunt across the dynamo-mains and is so wound that if the current supplied to the main be of the right polarity to charge the batteries the portion of the current flowing through the magnet 9 will oppose the action of the coil 10 upon the core 7, and if the current supplied be of the wrong polarity to charge the batteries the magnet 9 will generate lines of force in the same direction as the bobbin 10.

Thus it will be seen that the operation of this switch is practically as follows: The several windings and the spring 17 and the screw 19 having been properly adjusted and taking the coils 4 and 10 as being in series with the shunt-coils of the dynamo and these thrown in shunt across the battery-mains at the predetermined speed by a centrifugal switch, as indicated by 28, with the armature at rest or revolving at a speed considerably too low to generate the required voltage, there will be no current flowing through the switch, and it will stand open in the position shown in the drawing. Now if the speed of the armature increases, so as to cause the switch 28 to connect 29 and 30, allowing the battery-current to flow through the shunt-coils 26, the coils 4 and 10 will tend to cause the pole-piece 2 to repel the pole-piece 11, thus tending to aid the spring 17 to hold open the switch. Current will now flow through the dynamo-mains and the winding of the coil 9, and if it be of proper polarity to charge the cells will tend to overpower the coil 10 and cause the pole-piece 11 to be of opposite polarity to the pole-piece 2, thus causing the pole-pieces to attract each other. When the dynamo-current reaches the proper voltage, the spring 17 will be overpowered by the attraction of the magnets, and the pole-piece 11 will approach pole-piece 2, so as to cause the charging-circuit to be completed through 14 15 16. Current will then flow to the batteries and in so doing will flow through the coil 5, and thus strengthen the magnetic circuit, insuring a good contact at 14 15 16. The switch will thus remain closed as long as the proper current is supplied for charging the battery. If the voltage of the generator shall fall until equal that of the battery, no current will flow through the coil 5, and the influence of the coil 9 alone will tend to hold the switch closed. If the switch be so adjusted as to close when the voltage of the generator shall be somewhat above that of the batteries, it may be made to open at this point when the two electromotive forces become equal. If it be so adjusted as to close when the two forces shall become equal, it will not open until the voltage of the generator shall fall a little below the voltage of the cells, when a slight back discharge through the coil 5 will cause the switch to open immediately. Should the voltage of the generator again rise in the proper degree the switch would again close and the above-outlined operation be repeated. However, should the dynamo at any time supply a current to the mains of wrong polarity for charging the battery the switch will not close, inasmuch as the coil 9 will then merely strengthen the coil 10, causing the pole-piece 11 to be repelled by the pole-piece 2. Of course the coils must be properly proportioned and also the reluctance of the magnetic circuit, and with proper adjustment of the coils it is obvious that the yoke 6 may be made either of the magnetic or non-magnetic material. It is well known that the voltage of the storage battery rises somewhat as the process of charging continues and falls during discharge. Thus it is advantageous to have an automatic switch for completing the circuit between the dynamo and battery that will not only complete this circuit when the generator shall reach a certain predetermined fixed voltage, but within certain limits shall cause this closing voltage to vary with the voltage of the battery. This is accomplished in the above-described switch, since the strength of the magnets 4 and 10 will of course vary somewhat with the voltage of the battery from which they receive their current and since the magnet 9 has to overcome the action of 10 before closing the switch, thus causing the voltage of the generator to rise somewhat to correspond with the rise in the voltage of the battery before closing the switch.

It is obvious that various forms of this switch might be used other than shown in the accompanying drawing without departing from the spirit of my invention, and I do not wish in any way to limit myself to the particular construction shown, which is merely given as an illustration of one of the forms of switch as preferred by me.

Having thus described my invention, what I consider as novel, and wish to cover by Letters Patent, is as set forth in the following claims:

1. A main circuit containing a dynamo, a storage battery and an electromagnetic make-and-break switch having a coil or coils in said main circuit and having opposing coils in a derived circuit across the battery and an actuating coil or coils in a derived circuit across the dynamo-mains, substantially as described.

2. A main circuit containing a dynamo and a storage battery and an electromagnetic make-and-break switch having a coil or coils in said main circuit and having opposing magnets in a derived circuit across the battery and a centrifugally-controlled switch in said derived circuit and an actuating coil or coils in a derived circuit across the dynamo-terminals, substantially as described.

In testimony of all which I have hereunto subscribed my name.

JOHN L. CREVELING.

Witnesses:
H. G. DARWIN,
ELMER E. ALLBEE.